United States Patent
Pellach et al.

(10) Patent No.: US 8,938,628 B2
(45) Date of Patent: Jan. 20, 2015

(54) STAGGERED POWER-UP AND SYNCHRONIZED RESET FOR A LARGE ASIC OR FPGA

(75) Inventors: Lawrence S. Pellach, Malden, MA (US); Edward H. Truex, Sudbury, MA (US); Bhupen Shah, Boxborough, MA (US)

(73) Assignee: Acacia Communications, Inc., Maynard, MA (US)

( * ) Notice: Subject to any disclaimer, the term of this patent is extended or adjusted under 35 U.S.C. 154(b) by 242 days.

(21) Appl. No.: 13/411,515

(22) Filed: Mar. 2, 2012

(65) Prior Publication Data

US 2012/0226919 A1 Sep. 6, 2012

Related U.S. Application Data

(60) Provisional application No. 61/448,873, filed on Mar. 3, 2011.

(51) Int. Cl.
*G06F 1/26* (2006.01)
*G06F 1/10* (2006.01)

(52) U.S. Cl.
CPC ... *G06F 1/26* (2013.01); *G06F 1/10* (2013.01)
USPC .......................................... 713/300; 327/142

(58) Field of Classification Search
USPC ......... 713/1, 2, 100, 300, 310, 320, 321, 322, 713/323, 324, 330, 340, 375; 71/300, 310, 71/320, 330, 340
See application file for complete search history.

(56) References Cited

U.S. PATENT DOCUMENTS

| | | | | |
|---|---|---|---|---|
| 6,611,158 | B2 * | 8/2003 | Ehmann | 327/142 |
| 2003/0094983 | A1 * | 5/2003 | Takala et al. | 327/160 |
| 2005/0215274 | A1 * | 9/2005 | Matson et al. | 455/522 |
| 2011/0145618 | A1 * | 6/2011 | Andresen et al. | 713/330 |

* cited by examiner

*Primary Examiner* — Mark Connolly
*Assistant Examiner* — Paul J Yen
(74) *Attorney, Agent, or Firm* — Jeffery J. Brosemer

(57) ABSTRACT

Methods and apparatus for controlling the power-on current transients and for providing a gradual current draw in an ASIC or FPGA having a high gate count and a number of physical blocks are disclosed. Additionally, method(s) are disclosed which ensure related blocks emerge from a reset state on a common clock cycle even when the related blocks are geographically dispersed over a large area producing multiple clock cycle latency periods for signals between blocks. Complete flexibility of physical block start up is achieved by software control which permits the sequence and number of physical blocks started simultaneously.

10 Claims, 3 Drawing Sheets

STAGGERED POWER-UP AND SYNCHRONIZED RESET FOR A LARGE ASIC OR FPGA

CROSS REFERENCE TO RELATED APPLICATION

This application claims the benefit of U.S. Provisional Patent Application Ser. No. 61/448,873 filed Mar. 3, 2011 which is incorporated by reference in its entirety as if set forth at length herein.

TECHNICAL FIELD

This disclosure relates generally to the field of telecommunications and in particular to a method and implementation for the staggered power up and reset of large application specific integrated circuits (ASICs) and field programmable gate arrays (FPGA) that may include many millions of gates.

BACKGROUND

Continued improvements in semiconductor process have produced device geometries so small that many millions of individual gates and/or structures are now fabricated on a single semiconductor chip. Such chips are associated with large current transients upon power up, and provide a significant challenge for even the most advanced power system.

Accordingly methods and apparatus that address the problems associated with power-up transients for semiconductor devices would represent a welcome addition to the art.

SUMMARY

An advance in the art is made according to an aspect of the present disclosure directed to methods, apparatus, designs, and techniques for providing a gradual power-up of an ASIC or an FPGA thereby limiting large changes in current draw, while ensuring that multiple blocks across the chip come out of reset on the same clock edge, and thus are properly synchronized to begin their digital processing functions.

Viewed from a first aspect, the present disclosure is directed to methods, and apparatus that reduce the di/dt (change-in-current/change-in-time) as clocks are enabled in an ASIC or FGPA selectively, thereby favorably affecting power supply requirements and design.

Viewed from another aspect the present disclosure is directed to methods and apparatus that facilitate block reset de-assertion on the same clock edge at each block on the chip, even when those blocks are spread out over a very large die with latencies of multiple clock cycles in signal propagation between them.

As may be readily appreciated, such characteristics are particularly attractive when any subset of blocks comprising a design must remain synchronized, e.g., a polarization multiplexed demodulator system where the two polarizations must remain synchronized.

Advantageously, designs employing aspects of the present disclosure—in which the block level reset signals have no significant timing constraints placed on them—advantageously permit early layout convergence of the reset signal which is frequently difficult to close as the chip get bigger and the gate densities get higher.

According to one aspect of the present disclosure power transients in semiconductor devices are addressed—without the use of additional components or larger power systems—by controlling and enabling a gradual change in current at power-up. This gradual change is accomplished by enabling the system clock independently to each block within an ASIC or an FPGA.

Advantageously, methods according to an aspect of the present disclosure permit current changes associated with start up to be discretized into relatively small pieces. Of further advantage, software control can be employed to spread the current transient out as long as needed by the particular power system employed. Still further, methods according to the present disclosure permit multiple blocks of particular systems—e.g., polarization multiplexed quadrature phase shift keying (QPSK) demodulators—to emerge from a reset state on a common clock edge.

BRIEF DESCRIPTION OF THE DRAWING

A more complete understanding of the present disclosure may be realized by reference to the accompanying drawings in which.

DETAILED DESCRIPTION

Figure 1:
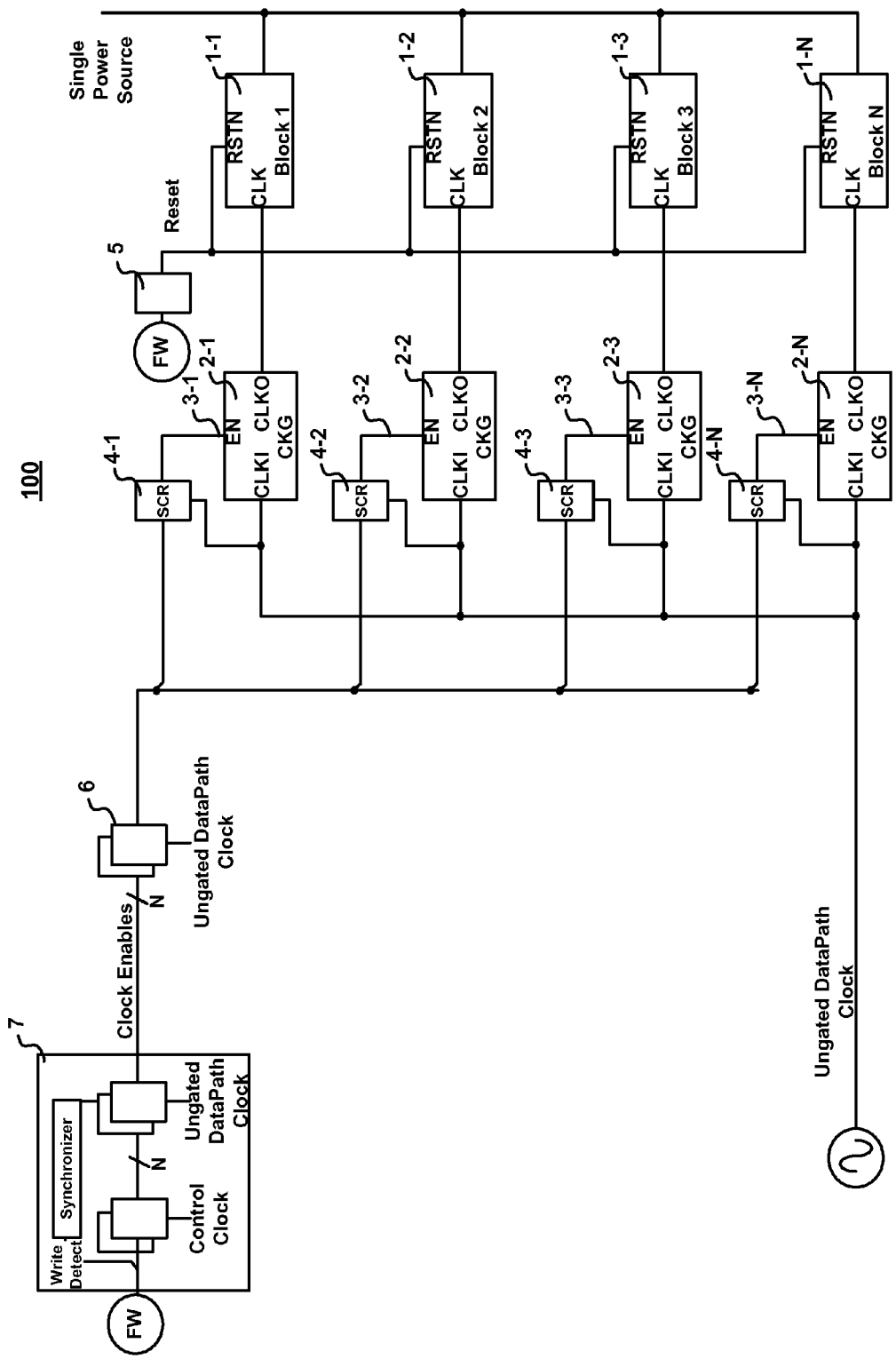
FIG. 1 shows an exemplary schematic of a staggered power up and reset synchronization system according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we again note that generally, when power is initially applied to a high gate count VLSI device (i.e., ASIC or an FPGA), reset is held asserted and clocks are turned off. After a settling period—during which time clock sources have stabilized—the clocks are enabled thereby allowing a reset signal(s) to propagate throughout the VLSI device. Note that this clock enablement is only true for synchronous reset systems. For asynchronous reset systems, clock is not needed for reset assertion but is needed for reset deassertion.

As may be readily appreciated by those skilled in the art, in a large VLSI device in which much of the data path operates on the same clock, this sudden clock activity can represent a change in current of 50% or more from an initial, quiescent state. Power supplies or systems that are capable of providing current deltas of this magnitude on the timescale of nanoseconds are generally impractical in a small form factor design.

Contemporary, high density ASICs and FPGAs may generate very large changes in power supply draw in a very short period of time. More particularly, when power is initially applied, a VLSI chip is brought up in a relatively quiet state, with reset asserted and the clocks stopped. Sometime later, after the power supply and phase locked loops (PLLs) have stabilized, the VLSI chip is brought out of reset.

A normal sequence is to first start control and data path clocks. Once these clocks are running, reset is re-asserted. After a prescribed reset time, reset is synchronously de-asserted and the chip begins normal operation.

With modern ASICs, the change in current between the quiescent state and normal operation can be anywhere from 50% to 80% of the total operational current, often exhibited in just a few nanoseconds.

Frequently, these devices are synchronous devices meaning that every flip-flop within the device switches on the same clock. Since—in CMOS technology—current draw is highest when transistors switch from one state to another, current transients are very large when every gate in the design switches on the same clock.

During normal operation this is usually not a problem because the difference in current draw at clock edges compared to non-edges is usually within the power system's capabilities. At initial power-up however, the power system experiences a rapid change from zero current draw to a very high current draw in a very small time window—typically a few hundred picoseconds. This current change can easily exceed a power system's ability to supply the current fast enough. Consequently, a drop in voltage results.

As those skilled in the art will readily appreciate, such a voltage drop may have many negative effects including damage to the device or more often sending the device into an unrecoverable state where it cannot properly perform its intended functions, i.e., signal processing.

Prior art attempts to solve these problems have frequently involved using a power supply or system large enough to supply any necessary startup currents through the use of large capacitors or other mechanisms. Such approaches are not practical or impossible in small systems such as an optical telecommunications module due to their prohibitive cost and/or physical space requirements.

According to an aspect of the present disclosure, a method is described herein which solves this problem without the use of additional components or larger power systems. Such a method according to the present disclosure controls and enables a gradual change in current at power-up.

The gradual change in current is advantageously achieved by selectively enabling a system clock independently to each block within an ASIC or an FPGA. This method permits the current changes to be made discrete—and into relatively small pieces.

Additionally, software control can be employed to spread the current transient out as long as needed by the particular power system employed.

Turning now to FIG. 1 there is shown a schematic of an exemplary circuit and associated elements for providing a staggered power up according to an aspect of the present disclosure. As is known in the art and as depicted in FIG. 1, a device represented by the circuit of FIG. 1 includes several, independent physical blocks 1. As those skilled in the art will appreciate, such physical blocks are generally formed by elements that provide a common function hence the name, functional block. Accordingly, the present disclosure may be applied to physical or functional blocks. In addition, we note that for our purposes herein the physical blocks referenced as 1 in the FIG. 1 may provide a same or similar function as one another or not—depending upon the particular application of the present disclosure. Accordingly, our inventive disclosure is directed to devices and/or structures having a number of physical blocks such as 1, regardless of their particular function.

Continuing with our reference of FIG. 1, it is noted that each of the individual physical blocks 1-1, 1-2, 1-3, . . . 1-N, include both a clock (CLK) and reset (RSTN) inputs. The clock (CLK) input to each physical block is driven by a clock signal which is output from a clock output (CLKO) of a clock gate device 2-1, 2-2, 2-3, . . . 2-N. As shown in FIG. 1, and according to an aspect of the present disclosure, each physical block 1-1, 1-2, 1-3, . . . 1-N, has its clock input (CLK) provided by a clock output of a respective clock gate device, 2-1, 2-2, 2-3, . . . 2-N.

As further depicted in FIG. 1, each of the clock gate devices 2-1, 2-2, 2-3, . . . 2-N, has an enable input (EN) 3-1, 3-2, 3-3, . . . 3-N, respectively. Those skilled in the art will readily appreciate that clock gate devices such as 2-1, 2-2, 2-3, . . . 2-N, shown in FIG. 1, will—when provided with a clock signal at their clock input (CLKI), —generate a clock output signal at their clock output (CLKO) when an enable signal is applied to their enable input (EN) 3-1, 3-2, 3-2, . . . 3-N.

Notably, and as depicted in FIG. 1, each of the individual enable inputs (EN) 3-1, 3-2, 3-3, . . . 3-N, is driven by a respective software controlled register, 4-1, 4-2, 4-3, . . . 4-N. Accordingly, when the respective software controlled register is so controlled by software, it drives the enable input (EN) on its respective clock gate device 2-1, 2-2, 2-3, . . . 2-N.

At this point we note further that each one of the individual physical blocks 1-1, 1-2, 1-3, . . . 1-N receives a common asynchronous reset signal (RESET) which provides a reset signal to a reset input (RSTN) on each of the physical blocks 1-1, 1-2, 1-3, . . . 1-N. The common asynchronous reset signal (RESET) is provided via a software controlled register 5 which may advantageously controlled via firmware FW.

In addition to controlling the reset signal(s) as described, firmware FW also controls the clock enable signals (EN) via the software controlled registers 4-1, 4-2, 4-3, . . . 4-N.

More particularly, a synchronizer block 7 synchronizes firmware writes (clock enables) to the data path clock before being sent to the destination clock gate device 2-1, 2-2, . . . 2-N via register 6. The synchronizer output clock enable is applied to register 6 which is preferably located physically close to the destination clock gate device for timing purposes.

As may be now appreciated, each individual clock for each one of the physical blocks 1-1, 1-2, 1-3, . . . 1-N is enabled or disabled via a respective clock gate device 2-1, 2-2, 2-3, . . . 2-N. When disabled, the clock output of a clock gate device 2-1, 2-2, 2-3, . . . 2-N is not active (not toggling). Conversely, when a clock gate device 2-1, 2-2, 2-3, . . . 2-N is enabled, the received data path clock output of buffers 6 is conveyed to respective physical blocks 1-1, 1-2, 1-3, . . . 1-N.

As may now be understood, and according to an aspect of the present disclosure, when power is applied to a device employing the circuit(s) described with respect to FIG. 1, (i.e., from a single power supply), the clock gates 2-1, 2-2, 2-3, . . . 2-N energize or "come up" in a disabled state such that each of the physical blocks 1-1, 1-2, 1-3, . . . 1-N, while powered, is not dissipating a significant amount of power because the clock is not toggling.

Advantageously, via software control, one physical block 1-1, 1-2, 1-3, . . . 1-N at a time can be physically enabled by simply writing a "1" to the clock gate enable bit associated with that physical block. As such, the system clock (also referred to as the data path clock in the FIG. 1) is then delivered to the respective physical block.

As may be appreciated, software may advantageously control when each physical block is supplied its clock (and therefore current requirement is increased). Furthermore, under software control, more than one physical block may be enabled at a time—by writing a "1" to multiple clock gate enable bits—or multiple blocks may be enabled at the same time.

Advantageously, enabling one physical block at a time results in a gradual current draw for the device, in small increments such that the power system can keep up with the increasing demand.

Of still further advantage, the particular order of block turn-on may be controlled as different physical blocks may produce different power transient characteristics. Accordingly, methods and structures according to an aspect of the present disclosure permits a flexibility in the order and in the number of blocks that are turned on simultaneously which is heretofore unknown in the art.

Finally, we note with respect to this programmable power up so far described that it is particularly applicable to those situations where only a single power supply is employed to provide power to a number of physical blocks. Advantageous power supply requirements and layouts result from methods according to the present disclosure.

As those skilled in the art will further appreciate, it is noted that in certain systems it is desirable or required that particular physical blocks must come out of a reset state on common clock cycle. When these particular blocks are spread out (geographically dispersed) over a die having a large surface area, a common signal such as reset may experience a latency of several clock cycles when propagating to destination blocks. Accordingly, the reset operation must be carefully planned in advance—oftentimes with distribution flops carefully located throughout a design. Additionally, and as will be readily appreciated by those skilled in the art, a reset "net" might also need to be treated like a clock, with clock tree synthesis employed to balance latencies to all of the blocks. Of course, these requirements can place significant constraints on flop placement and routing.

Figure 2:
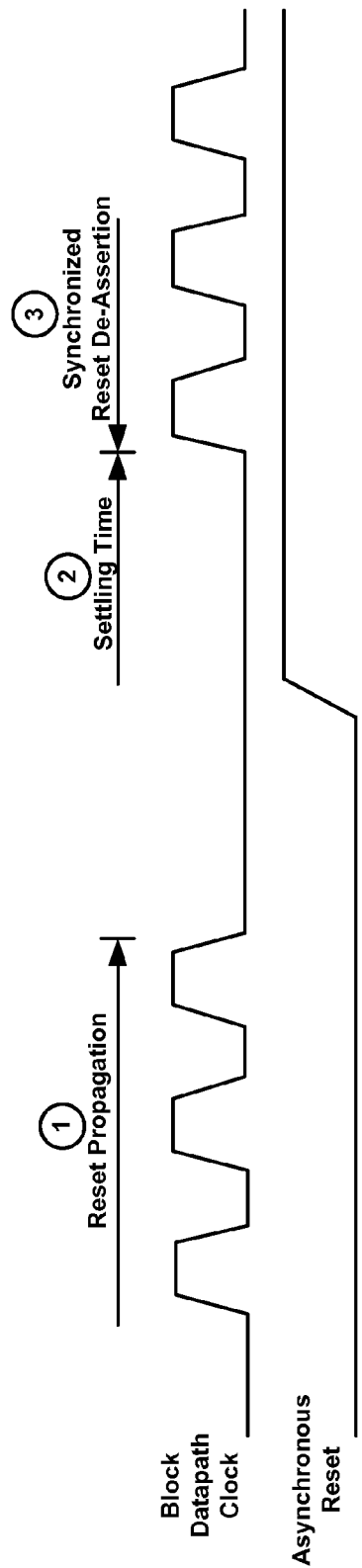
FIG. 2 shows a timing diagram of a common reset according to an aspect of the present disclosure.

Turning now to FIG. 2, there is shown several clock waveforms according to an aspect of the present disclosure. As noted above, one particular aspect of the present disclosure is that certain physical blocks will advantageously come out of a reset condition at the same clock cycle. This is achieved generally by: A) turning on the clocks while reset is asserted (active low in FIG. 2, the "Reset Propagation" time period referenced to as 1); B) turning off the clocks, followed by de-asserting reset (the "Settling Time" time period referenced to as 2); C) waiting several clock periods for the de-assertion to propagate to the related block; and then D) turning the clocks back on (the "Synchronized Reset De-assertion" time period referenced to as 3).

Notably, the signal "Asynchronous Reset" is shown as 5 in FIG. 1. Note that the reset signal may be synchronous or asynchronous, and advantageously a method according to the present disclosure works well for either case.

Those skilled in the art will recognize that our description provided herein is merely exemplary and additional variations to our teachings are possible and contemplated. More particularly, a method according to the present disclosure allows complete flexibility for any device employing the method and is advantageously insensitive to any relative delay(s) between physical blocks since the clocks are controlled by software, In addition, a method according to the present disclosure is layout friendly as it requires no special treatment from a physical design (place & route) perspective posing no additional constraints over how the reset signals are routed. Of course, clock gates (e.g., 2-1, 1-2, 2-3, . . . 2-N in FIG. 1) may be placed physically close to the physical block whose clock is being controlled. Similarly, a clock enable (4 in FIG. 1) may also be placed close to the clock gate it enables—as design dictates.

Figure 3:
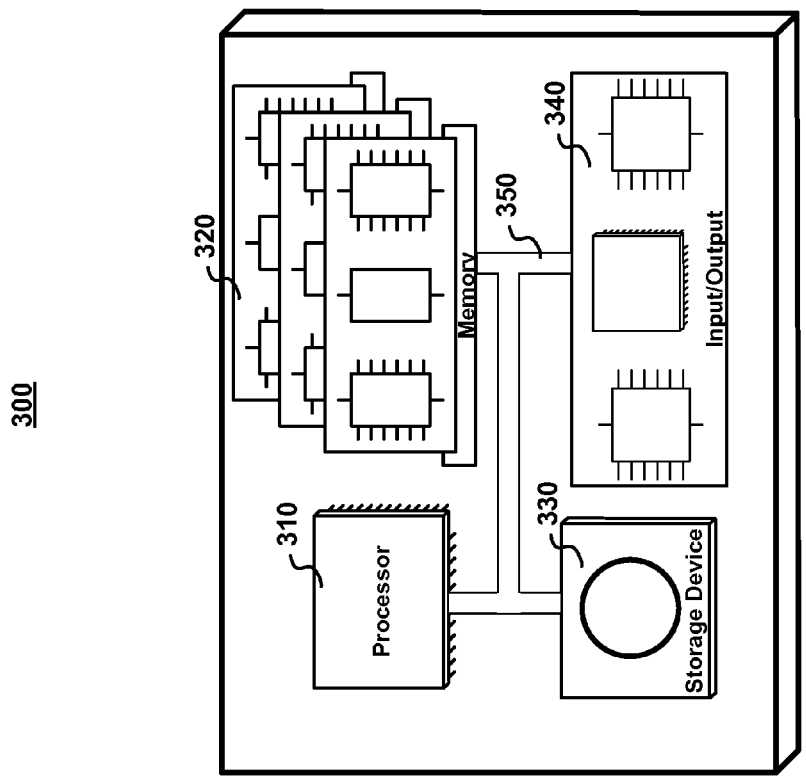
FIG. 3 is a block diagram showing a representative computer system which may control overall operation of a system employing a method according to the present disclosure.

FIG. 3 shows an illustrative computer system 900 suitable for implementing methods and systems according to an aspect of the present disclosure. The computer system may comprise, for example a computer running any of a number of operating systems. The above-described methods of the present disclosure may be implemented on the computer system 900 as stored program control instructions.

Computer system 300 includes processor 310, memory 320, storage device 330, and input/output structure 340. One or more busses 350 typically interconnect the components, 310, 320, 330, and 340. Processor 310 may be a single or multi core.

Furthermore, while the system is shown as being a number of discrete elements above, those skilled in the art will readily appreciate that such structures may be integrated into a common device and as such be considered a "microcontroller" or a "microcomputer on a chip", or some other common designation.

Processor 310 executes instructions in which embodiments of the present disclosure may comprise steps described in one or more of the Figures. Such instructions may be stored in memory 320 or storage device 330. Data and/or information may be received and output using one or more input/output devices, and in particular output to the staggered power-up circuitry and systems that are the subject of the present disclosure.

Memory 320 may store data and may be a computer-readable medium, such as volatile or non-volatile memory. Storage device 330 may provide storage for system 300 including for example, the previously described methods. In various aspects, storage device 330 may be a flash memory device, a disk drive, an optical disk device, or a tape device employing magnetic, optical, or other recording technologies.

Input/output structures 340 may provide input/output operations for system 300.

While the methods, systems, and apparatus according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A method for applying initial power-up power to a synchronous, high gate count, very large scale integrated circuit (VLSI) device such as an Application Specific Integrated Circuit (ASIC) or Field-Programmable Gate Array (FPGA), said VLSI circuit being synchronous in that every flip-flop within the circuit switches on the same clock, said VLSI circuit having a number of physical blocks geographically dispersed across the device, wherein one or more of the physical blocks produce different power transient characteristics from one another and include data paths which operate on the same clock, the method comprising the steps of:
   a) applying a power signal to each of the physical blocks while preventing the application of a system clock to each of the physical blocks; and
   b) selectively enabling the system clock to individual one(s) of the physical blocks by
      1) turning on the clocks while a RESET is asserted;
      2) turning off the clocks followed by de-asserting the RESET;
      3) waiting several clock periods for the de-assertion to propagate; and
      4) turning the clocks back on;
   c) wherein the selective enabling of the system clock to individual one(s) of the physical blocks is done under software control;
   such that the physical blocks emerge from a reset state on a common clock edge.

2. The method of claim 1 wherein the power signal applied to each of the physical blocks originates at a single, common power supply.

3. The method of claim 2 wherein the power signal is applied to each of the physical blocks in a predetermined order.

4. The method of claim 2 wherein the software control results from the operation of a digital computer.

5. The method of claim 2 further comprising the steps of releasing a RESET signal to the physical blocks such that all of the blocks simultaneously reset.

6. The method of claim 5 wherein the simultaneous reset results in each of the physical blocks simultaneously reset on the same clock signal.

7. A system comprising:
   a synchronous, high gate count, very large scale integrated circuit (VLSI) device such as an Application Specific Integrated Circuit (ASIC) or Field-Programmable Gate Array (FPGA), said VLSI circuit being synchronous in that every flip-flop within the circuit switches on the same clock, said VLSI circuit having a number of physical blocks geographically dispersed across the device, wherein one or more of the physical produce different power transient characteristics from one another and include data paths that operate on the same clock,
   a means for applying initial power-up power to the blocks, while the common clock is disabled;
   a means for selectively enabling the common clock to selective ones of the physical block which
      1) turns off the clocks while a RESET is asserted;
      2) turns off the clocks followed by de-asserting the RESET;
      3) waits several clock periods for the de-assertion to propagate; and
      4) turns the clocks back on;
   wherein the selective enabling means is under software control and the physical blocks emerge from a reset condition simultaneously on a common clock edge.

8. The system of claim 7 further comprising a means for providing a common power signal to the physical blocks originating from a single power supply.

9. The system of claim 8 further comprising a means for applying to each of the physical blocks in a predetermined order the power signal.

10. The system of claim 9 further comprising a means for releasing a RESET signal to the physical blocks such that all of the blocks simultaneously reset on the same clock signal.

* * * * *